US012783244B2

(12) United States Patent
Byeon et al.

(10) Patent No.: US 12,783,244 B2
(45) Date of Patent: Nov. 3, 2026

(54) APPARATUS AND METHOD FOR PARALLEL PROCESSING

(71) Applicant: Research & Business Foundation SUNGKYUNKWAN UNIVERSITY, Suwon-si (KR)

(72) Inventors: Gwangeun Byeon, Suwon-si (KR); Seung Tae Lee, Suwon-si (KR); Seongwook Kim, Suwon-si (KR); Seokin Hong, Suwon-si (KR)

(73) Assignee: Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 44 days.

(21) Appl. No.: 18/930,458

(22) Filed: Oct. 29, 2024

(65) Prior Publication Data

US 2025/0156188 A1 May 15, 2025

(30) Foreign Application Priority Data

Nov. 9, 2023 (KR) ........................ 10-2023-0154867

(51) Int. Cl.
*G06F 9/38* (2018.01)

(52) U.S. Cl.
CPC .................................. *G06F 9/3836* (2013.01)

(58) Field of Classification Search
CPC .................................................... G06F 9/3836
See application file for complete search history.

(56) References Cited

U.S. PATENT DOCUMENTS

2013/0332774 A1* 12/2013 Sinanoglu ........... G06F 11/2242 714/32
2014/0188965 A1* 7/2014 Iacobovici ................ G06F 7/72 708/491
2015/0058603 A1* 2/2015 Anderson ........... G06F 9/30047 712/226
2018/0285314 A1* 10/2018 Higeta ................ G06F 9/30032
2021/0303372 A1* 9/2021 Santoni ............... G06F 11/1629
2022/0206065 A1* 6/2022 Viswanathan Pillai ...................... H03K 3/037

FOREIGN PATENT DOCUMENTS

KR 10-2014-0134371 A 11/2014
KR 10-2020-0041154 A 4/2020
KR 10-2020-0096102 A 8/2020
KR 10-2021-0136994 A 11/2021

OTHER PUBLICATIONS

Request for the Submission of an Opinion for Korean Patent Application No. 10-2023-0154867, dated Oct. 13, 2025.

* cited by examiner

*Primary Examiner* — Michael J Metzger

(57) ABSTRACT

There is provided a method of operating an apparatus for parallel processing including multiple cores, comprising: searching for a zero core among the multiple cores performing multiplication calculations to process a first instruction, wherein the zero core includes at least one operand of the multiplication calculations performed by each of the multiple core that is zero; performing multiplication calculations in each of the multiple cores, wherein at least one zero core performs the multiplication calculations for same operands as operands of a non-zero core, wherein the non-zero core includes operand that is not zero; and comparing a calculation result of the at least one zero core with a calculation result of the non-zero core to determine whether calculation error has occurred.

19 Claims, 9 Drawing Sheets

GENERAL OPERATION

ERROR DETECTION OPERATION

ERROR CORRECTION OPERATION

DEFECT ISOLATION OPERATION

APPARATUS AND METHOD FOR PARALLEL PROCESSING

CROSS REFERENCE TO RELATED APPLICATIONS

This application claims the benefit under 35 USC § 119(a) of Korean Patent Application No. 10-2023-0154867, filed on Nov. 9, 2023, the entire disclosure of which is incorporated herein by reference for all purpose.

TECHNICAL FIELD

The present invention relates to an apparatus for parallel processing capable of error detection and error correction. This work was supported by Institute of Information & communications Technology Planning & Evaluation (IITP) grant funded by the Korea government(Ministry of Science and ICT) (Project unique No.: 1711193550; Project No.: 2021-0-00863-003; R&D project: Development of new concept PIM semiconductor technology; Research Project Title: Development of an intelligent in-memory error correction device for high-reliability memory; and Project period: 2023.01.01.~2023.12.31.), and Institute of Information & communications Technology Planning & Evaluation (IITP) grant funded by the Korea government(Ministry of Science and ICT) (Project unique No.: 1711193592; Project No.: 2021-0-02052-003; R&D project: Information and Communication Broadcasting Innovation Talent Training; Research Project Title: Artificial intelligence system for smart mobility Development of core semiconductor technologies and training of personnel; and Project period: 2023.01.01.~2023.12.31.), and Institute of Information & communications Technology Planning & Evaluation (IITP) grant funded by the Korea government(Ministry of Science and ICT) (Project unique No.: 1711195788; Project No.: 00228970; R&D project: Next-generation intelligent semiconductor technology development (design); Research Project Title: Development of Flexible SW/HW Conjunctive Solution for on-edge self-supervised learning; and Project period: 2023.04.01.~2023.12.31.).

BACKGROUND

An apparatus for parallel processing, including multiple cores, divides a single task into multiple threads and processes parallel calculations for the multiple threads using the multiple cores. In cases where most of the cores perform multiplication calculations, there is a problem that multiple cores need to collectively perform calculations even when at least one of the operands is zero, resulting in zero as the output of the multiplication calculations. Korean Patent Application Publication No. 10-2020-0096102 discloses the background of the present invention.

SUMMARY

The object of the present invention is to provide a technology for detecting and correcting errors in calculations in parallel processing.

In addition, the object of the present invention is to provide a technology for detecting and correcting errors in calculations in parallel processing, including sparse matrix calculations such as training of an artificial neural network model.

In addition, the object of the present invention is to provide a technology for detecting and correcting errors in calculations in the parallel processing of a GPU.

In addition, the object of the present invention is to provide a technology for detecting the occurrence of faults in multiple cores for parallel processing and isolating the cores where faults have occurred.

In accordance with an aspect of the present disclosure, there is provided a method of operating an apparatus for parallel processing including multiple cores, comprising: searching for a zero core among the multiple cores performing multiplication calculations to process a first instruction, wherein the zero core includes at least one operand of the multiplication calculations performed by each of the multiple core that is zero; performing multiplication calculations in each of the multiple cores, wherein at least one zero core performs the multiplication calculations for same operands as operands of a non-zero core, wherein the non-zero core includes operand that is not zero; and comparing a calculation result of the at least one zero core with a calculation result of the non-zero core to determine whether calculation error has occurred.

In determining whether the calculation error has occurred, when the calculation result of the at least one zero core does not match the calculation result of the non-zero core, it may be determined that an error has occurred in the multiplication calculations performed by the non-zero core or the at least one zero core.

The method may further comprise: re-performing, by at least three cores including the non-zero core and the zero core among the multiple cores, multiplication calculations for operands calculated by the non-zero core when it is determined that an error has occurred in the multiplication calculations performed by the non-zero core or the zero core; and determining whether there is a fault in the non-zero core based on multiplication calculation results of the at least three cores.

In the determining whether there is a fault in the non-zero core or the zero core, when the multiplication calculation result of the non-zero core or the zero core among the at least three cores does not match calculation results of the other cores, it may be determined that there is a fault in the non-zero core or the zero core.

The method may further comprise: setting, when it is determined that there is a fault in the non-zero core or the zero core, in processing a second instruction, to be processed after the first instruction has been processed, another zero core to perform multiplication calculations to be performed in the non-zero core or zero core determined to have a fault.

In the re-performing of the multiplication calculations, when it is determined that there is an error in the multiplication calculations performed by the non-zero core or the zero core, processing of a second instruction, to be processed after the first instruction has been processed, it may not be started and the multiplication calculations may be re-performed.

The method may further comprise: setting, when it is determined that an error has occurred in the multiplication calculations performed by the non-zero core or the zero core, and calculation results of two or more cores match each other, the multiplication calculation results of the two or more cores as the multiplication calculation result of the non-zero core or the zero core.

The first instruction may include multiplication calculations for a sparse matrix.

In the searching for the zero core, the zero core may be searched by performing logical multiplication calculations on operands to be processed by each of the multiple cores in the first instruction to identify whether at least one operand is zero.

In accordance with another aspect of the present disclosure, there is provided an apparatus for parallel processing, comprising: multiple cores that perform parallel processing; a zero-core search unit configured to search for a zero core among the multiple cores performing multiplication calculations to process a first instruction, wherein the zero core includes at least one operand of the multiplication calculations performed by each of the multiple core that is zero; a calculation controller configured to perform multiplication calculations in each of the multiple cores and control at least one zero core to perform the multiplication calculations for same operands as operands of a non-zero core, wherein the non-zero core includes operand that is not zero; and an error determination unit configured to determine whether calculation error has occurred by comparing a calculation result of the at least one zero core with a calculation result of the non-zero core.

The error determination unit may be further configured to determine that there is an error in the multiplication calculations performed by the non-zero core or the zero core when the multiplication calculation result of the at least one zero core does not match the multiplication calculation result of the at least one non-zero core.

The calculation controller may be further configured to control at least three cores, including the non-zero core and the zero core among the multiple cores, to re-perform multiplication calculations for operands calculated by the non-zero core when it is determined that there is an error in the multiplication calculations performed by the non-zero core or the zero core, and wherein the error determination unit is further configured to determine whether there is a fault in the non-zero core or the zero core based on multiplication calculation results of the at least three cores.

The error determination unit may be further configured to determine that there is a fault in the non-zero core or the zero core when the multiplication calculation result of the non-zero core or the zero core among the at least three cores does not match calculation results of the other cores.

The error determination unit may be further configured to set, when it is determined that there is a fault in the non-zero core or the zero core, in processing a second instruction, to be processed after the first instruction has been processed, another zero core to perform multiplication calculations to be performed in the non-zero core or zero core determined to have a fault.

The calculation controller may be further configured to control to re-perform the multiplication calculations without starting processing of a second instruction, to be processed after the first instruction has been processed, when it is determined that there is an error in the multiplication calculations performed by the non-zero core or the zero core.

The calculation controller, when it is determined that there is an error in the multiplication calculations performed by the non-zero core or the zero core, and calculation results of two or more zero cores match each other, may be further configured to set the multiplication calculation results of the two or more zero cores as the multiplication calculation result of the non-zero core.

The first instruction may include multiplication calculations for a sparse matrix.

The zero-core search unit may be further configured to search for the zero core by performing logical multiplication calculations for operands to be processed by each of the multiple cores in the first instruction to identify whether at least one operand is zero.

In accordance with another aspect of the present disclosure, there is provided a method of operating an apparatus for parallel processing including multiple cores, comprising: receiving an instruction that includes N threads as input; allocating the N threads to each of multiple cores; searching for at least one zero thread among the N threads, where at least one of operands of multiplication calculations is zero; reallocating at least one zero core that has been allocated at least one zero thread to process the same non-zero thread as a non-zero core matched to a non-zero thread that is not the zero thread; and determining whether an error has occurred in the multiplication calculations of the non-zero core based on a multiplication calculation result of at least one zero core according to the reallocation and a multiplication calculation result of the non-zero core.

According to one aspect of the present invention, it is possible to detect and correct calculation errors in parallel processing.

In addition, according to another aspect of the present invention, it is possible to detect and correct calculation errors in parallel processing, including sparse matrix calculations such as training of an artificial neural network model.

In addition, according to yet another aspect of the present invention, it is possible to detect and correct calculation errors in the parallel processing of a GPU.

In addition, according to yet another aspect of the present invention, it is possible to detect the occurrence of faults in multiple cores for parallel processing and to isolate the cores where faults have occurred.

DETAILED DESCRIPTION OF THE INVENTION

Advantages and features of the present invention and methods of achieving the advantages and features will be clear with reference to embodiments described in detail below together with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing embodiments of the present invention, detailed descriptions of well-known functions or configurations will be omitted unless they are essential for describing the embodiments of the present invention. In addition, the terms used in the exemplary embodiments of the present invention are defined considering the functions in the present invention and may vary depending on the intention or usual practice of a user or an operator. Therefore, the definition of the present disclosure should be made based on the entire contents of the present specification.

The term "unit", "part", "module", or the like, which is described in the specification hereinafter, refers to a unit that performs at least one function or operation, and the "unit", "part", "module" or the like may be implemented by hardware, software, or a combination of hardware and software.

Figure 1:
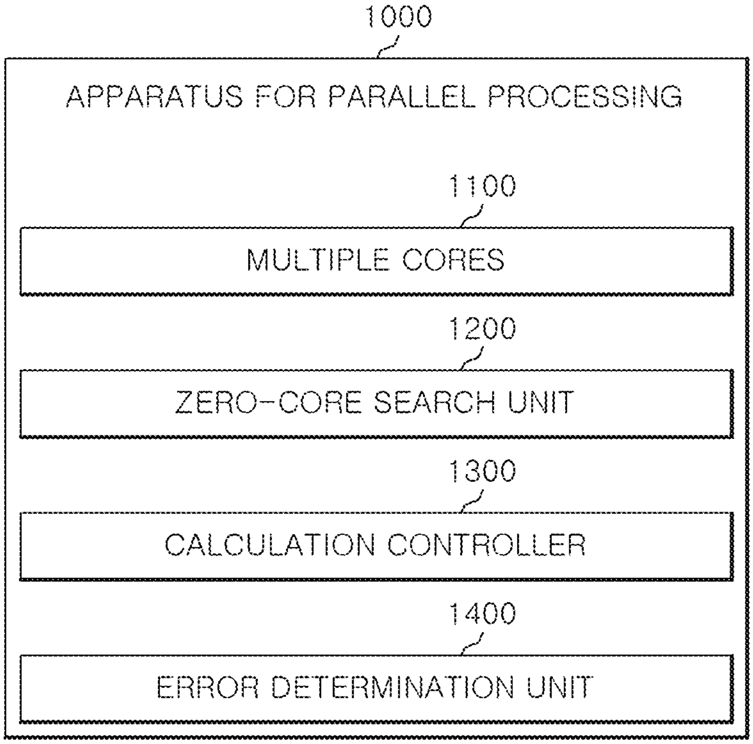
FIG. 1 is a block diagram of an apparatus for parallel processing according to an embodiment of the present invention.

FIG. 1 is a block diagram of an apparatus for parallel processing according to an embodiment of the present invention.

With reference to FIG. 1, an apparatus for parallel processing 1000 may include multiple cores 1100, a zero-core search unit 1200, a calculation controller 1300, and an error determination unit 1400.

The multiple cores 1100 are each an independent processing unit and may perform parallel calculations to process a single instruction.

In an embodiment, the multiple cores 1100 may refer to multiple cores 1100 included in a GPU or the like.

In an embodiment, the multiple cores 1100 may process an instruction that has N threads as a unit (e.g., warp), where each of the multiple cores 1100 processes calculations for a single thread, thereby performing parallel calculations for the instruction.

In an embodiment, the multiple cores 1100 may process instructions using the single instruction multiple thread (SIMT) method.

In an embodiment, the instruction may include multiplication calculations for a sparse matrix. Specifically, the instruction may include calculations for a feature matrix that has passed through the activation function ReLU (rectified linear unit) of an artificial neural network model such as a deep neural network (DNN) or a convolutional neural network (CNN), that is, a matrix containing many zero elements. An artificial neural network model, such as a deep neural network (DNN) model or a convolutional neural network (CNN) model, uses an activation function to learn complex nonlinear representations. The most widely used activation function is the rectified linear unit (ReLU). The ReLU activation function may replace all negative values in the activation feature matrix with zero. Due to this characteristic, the activation feature matrix that has passed through the ReLU function becomes a sparse matrix with many zero values. In addition, the pruning technique used for model compression creates weights of low importance to zero. Consequently, due to the two factors of the ReLU activation function and pruning, deep neural networks mainly perform sparse matrix multiplication calculations. Therefore, the apparatus for parallel processing according to the present invention may also be applied to the training and use of artificial neural network models including calculations for sparse matrices. In addition, multiply-accumulate (MAC) calculations, which are mainly used in matrix multiplication calculations, are defined as D=A*B+C. Sparse matrix multiplication calculations create many of operands A and B required for MAC calculations to zero, which means that regardless of whether MAC calculations are performed, the final result (D=0+C=D) remains unchanged. Therefore, the sparsity that occurs in the DNN may create unnecessary calculations, reducing calculation efficiency. Accordingly, the present invention may make it possible to use these unnecessary calculations for error correction.

The zero-core search unit 1200 may search for at least one core (hereinafter, "zero core"), among the multiple cores 1100, that performs multiplication calculations, where at least one of the operands in the multiplication calculations is zero, in order to parallel process the instruction.

In an embodiment, the zero-core search unit 1200 may perform logical multiplication calculations between operands allocated to each of the multiple cores 1100 to search for at least one zero core.

In an embodiment, the zero-core search unit 1200 may search among the N (a natural number of 2 or greater) threads allocated to each of the multiple cores 1100 for a thread (hereinafter, "zero thread") where at least one of the operands of the multiplication calculations is zero. Depending on the search result, the core allocated the zero thread may be determined as a zero core, and the core allocated a thread that is not a zero thread (non-zero thread) may be determined as a non-zero core.

The calculation controller 1300 may control the overall operation of the apparatus for parallel processing 1000 to process instructions.

In an embodiment, the calculation controller 1300 may control the operation of the multiple cores 1100 to perform parallel processing of instructions in the multiple cores 1100.

Specifically, the calculation controller 1300 may divide an instruction into N threads corresponding to the number of cores and control to process the N threads in parallel in each of the multiple cores 1100

In an embodiment, the calculation controller 1300 may control at least one zero core to perform multiplication calculations for the same operands as those of a core whose operand is not zero (hereinafter, "non-zero core").

In an embodiment, the calculation controller 1300 may control at least one zero core to perform multiplication calculations for the same operands as those of the multiplication calculations performed by a non-zero core when processing a first instruction. Specifically, in parallel processing of the first instruction, when the operands processed by a first core (zero core) are A1 and B1, at least one of which is zero, while the operands processed by a second core are A2 and B2, both of which are not zero, since the result of the multiplication calculations by the first core is zero, the first core may be controlled to perform multiplication calculations for the same operands A2 and B2 as those of the second core, in order to use the calculation operation of the first core to detect whether an error occurred in the calculations of the second core.

In an embodiment, when the calculation controller 1300 determines that an error has occurred in the calculations, the calculation controller 1300 may control such that the calculations for the operands in which the calculation error occurred are re-performed in each of three or more cores, including the non-zero core and the zero core where the calculation error occurred.

In an embodiment, when the calculation controller 1300 determines that an error has occurred in the calculations, the calculation controller 1300 may stop the input of the instruction to be processed after the first instruction was processed (hereinafter, "second instruction") and control each of three or more cores, including the non-zero core and the zero core in which the calculations has been performed, to re-perform the calculations for the operands to be processed by the non-zero core.

In an embodiment, the calculation controller 1300 may allocate threads to be processed by each of the multiple cores 1100. In addition, the calculation controller 1300 may allocate a non-zero thread allocated to a non-zero core to at least one zero core, even when a zero thread has already been allocated to the zero core.

The error determination unit 1400 may determine whether an error has occurred in the calculations performed by the core based on the calculation result of the non-zero core and the calculation result of at least one zero core.

In an embodiment, the error determination unit 1400 may determine that an error has occurred in the calculation result for the operand performed by the non-zero core or the zero core when the calculation result performed by the non-zero core does not match the calculation result performed by the zero core.

In an embodiment, the error determination unit 1400 may determine that an error has occurred in the operand calculations performed by the non-zero core when the calculation result of the non-zero core does not match the calculation result of at least one zero core.

In an embodiment, the error determination unit 1400 may determine that there is no error in the calculations of the non-zero core and the zero core when the calculation result of the non-zero core matches the calculation result of the zero core. In this case, the error determination unit 1400 may output the calculation result of the zero core as zero, which is the result of the multiplication calculations for the operands that were originally supposed to be processed.

In an embodiment, the error determination unit 1400 may, when the calculation results of two or more cores match each other and the calculation result of one core differs from those of the two or more cores, correct the calculation error of the core with differing calculation results by replacing the calculation result of the core with differing calculation results with the calculation result of two or more cores In an embodiment, the error determination unit 1400 may determine whether one core has faulted based on the calculation results of three or more cores that calculated the same operand.

In an embodiment, when, even after re-performing the multiplication calculations for the operands with errors, the calculation result of one core among the three cores does not match the calculation result of the other two or more cores, the error determination unit 1400 may determine that a fault, i.e., a mechanical defect has been occurred in the one core that does not match the result. This is because, when calculation errors have repeatedly occurred, it is highly likely that a permanent fault has occurred in the core.

In an embodiment, when, after re-performing the multiplication calculations for the operands with errors, the calculation result of the non-zero core matches the calculation results of two or more non-zero cores, the error determination unit 1400 may use the current performed calculation result as the calculation result of the non-zero core. Then, the error determination unit 1400 may receive the input of the second instruction to be processed after the first instruction.

In addition, the error determination unit 1400 may perform error detection and error correction using a voting method. For example, the error determination unit 1400 may determine the calculation result for the operand as the calculation result derived most frequently when three or more cores perform calculations for the same operand but different calculation results have been derived.

Figure 2:
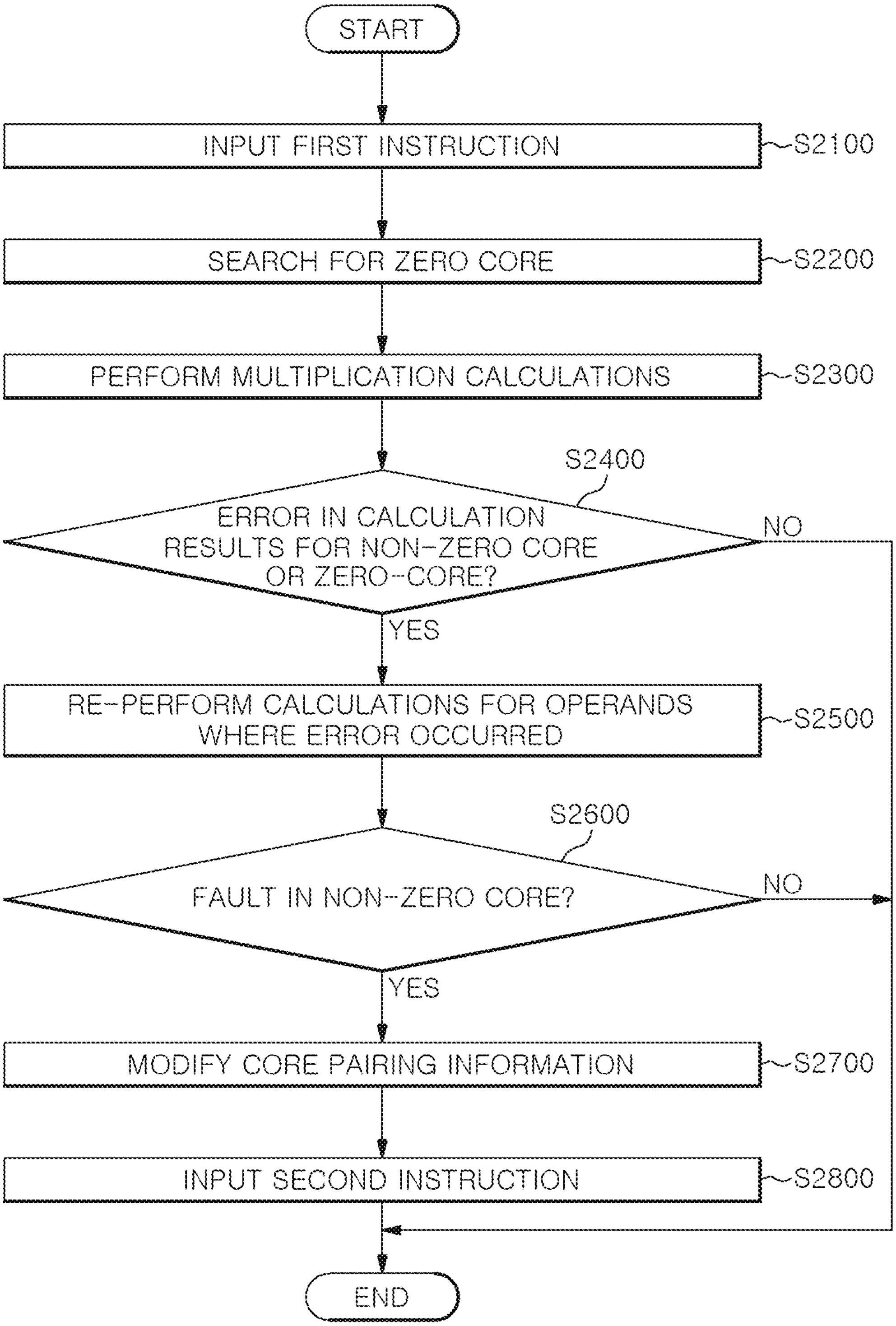
FIG. 2 is a flowchart illustrating a method of operating an apparatus for parallel processing according to an embodiment of the present invention.

FIG. 2 is a flowchart illustrating a method of operating an apparatus for parallel processing according to an embodiment of the present invention.

Hereinafter, the method will be described in terms of example as being performed by the apparatus for parallel processing 1000 illustrated in FIG. 1.

In step S2100, the apparatus for parallel processing 1000 may receive an instruction (hereinafter, "first instruction") to perform parallel processing using the multiple cores 1100.

In an embodiment, the instruction may include multiplication calculations for a sparse matrix. Specifically, the instruction may include calculations for a feature matrix that has passed through the activation function ReLU (rectified linear unit) of an artificial neural network model such as a deep neural network (DNN) or a convolutional neural network (CNN), that is, a matrix containing many zero elements.

In step S2200, the apparatus for parallel processing 1000 may search for at least one core (hereinafter, "zero core"), among the multiple cores 1100, that performs multiplication calculations, where at least one of the operands in the multiplication calculations is zero, in order to parallel process the first instruction.

In an embodiment, the apparatus for parallel processing 1000 may search for at least one zero core by performing logical multiplication calculations (logical AND calculations) between the operands to be allocated to each of the multiple cores 1100.

In an embodiment, the apparatus for parallel processing 1000 may determine whether to perform error detection and correction operations based on the number of zero cores and the number of cores that are not zero core (hereinafter, "non-zero core") according to the zero core search result. Since the present invention assumes processing for a sparse matrix in which zeros are more frequent than ones, the following describes the case in which error detection and correction operations are performed in processing an instruction.

In step S2300, the apparatus for parallel processing 1000 may perform multiplication calculations for the same operands as those of the multiplication calculations to be performed by one non-zero core in at least one zero core in processing the first instruction. Specifically, in parallel processing of the first instruction, when the operands processed by a first core (zero core) are A1 and B1, at least one of which is zero, while the operands processed by a second core are A2 and B2, both of which are not zero, since the result of the multiplication calculations by the first core is zero, the first core may perform multiplication calculations for the same operands A2 and B2 as those of the second core, in order to use the calculation operation of the first core to detect whether an error occurred in the calculations of the second core.

In step S2400, the apparatus for parallel processing 1000 may determine whether an error has occurred in the calculations performed by the non-zero core or the zero core, based on the calculation result of the non-zero core and the calculation result of at least one zero core.

In an embodiment, the apparatus for parallel processing 1000 may determine that an error has occurred in the calculation result for the operand performed by the non-zero core or the zero core when the calculation result performed by the non-zero core does not match the calculation result performed by the zero core.

In an embodiment, the apparatus for parallel processing 1000 may determine that an error has occurred in the calculations performed by the non-zero core or the zero core when the calculation result of the non-zero core does not match the calculation result of at least one zero core.

In an embodiment, the apparatus for parallel processing 1000 may determine that there is no error in the calculations of the non-zero core and the zero core when the calculation result of the non-zero core matches the calculation result of the zero core. In this case, the apparatus for parallel processing 1000 may output the calculation result of the zero core as zero, which is the result of the multiplication calculations for the operands that were originally supposed to be processed.

In an embodiment, the apparatus for parallel processing 1000 may, when the calculation results of two or more cores match each other and the calculation result of one core differs from those of the two or more cores, correct the calculation error of the core with differing calculation results by replacing the calculation result of the core with differing calculation results with the calculation result of two or more cores.

In step S2500, when the apparatus for parallel processing 1000 determines that an error has occurred in the calculations, the apparatus for parallel processing 1000 may re-perform the calculations for the operands in which the calculation error occurred in each of three or more cores, including the non-zero core and the zero core where the calculation error occurred.

In an embodiment, when the apparatus for parallel processing 1000 determines that an error has occurred in the calculations of the core, the apparatus for parallel processing 1000 may stop the input of the instruction to be processed after the first instruction (hereinafter, "second instruction") and re-perform the calculations for the operands to be processed by the non-zero core in each of three or more cores, including the non-zero core and the zero core that performed the calculations.

In step S2600, the apparatus for parallel processing 1000 may determine whether a core has faulted based on the calculation results of three or more cores that performed calculations for the same operand.

In an embodiment, when, even after re-performing the multiplication calculations for the operands with errors, the calculation result of one core among the three cores does not match the calculation result of the other two or more cores, the apparatus for parallel processing 1000 may determine that a fault, i.e., a mechanical defect has been occurred in the one core that does not match the result. This is because, when calculation errors have repeatedly occurred, it is highly likely that a permanent fault has occurred in the core.

In an embodiment, the apparatus for parallel processing 1000 may perform error detection and error correction using a voting method. For example, the error determination unit 1400 may determine the calculation result for the operand as the calculation result derived most frequently when three or more cores perform calculations for the same operand but different calculation results have been derived.

In an embodiment, when, after re-performing the multiplication calculations for the operands with errors, the calculation result of the non-zero core matches the calculation results of two or more non-zero cores, the apparatus for parallel processing 1000 may use the current performed calculation result as the calculation result of the non-zero core. Then, the apparatus for parallel processing 1000 may receive the input of the second instruction to be processed after the first instruction.

In step S2700, when the apparatus for parallel processing 1000 determines that a fault has occurred in the non-zero core, the apparatus for parallel processing 1000 may modify core pairing information used for distributing the operands to be processed by each of the multiple cores 1100 for parallel processing of the instruction.

In an embodiment, the apparatus for parallel processing 1000 may modify the core pairing information to have the operands that need to be processed by the core determined to have a fault calculated by another zero core in processing subsequently input instructions.

In step S2800, the apparatus for parallel processing 1000 may receive the input of the second instruction and perform parallel processing of the second instruction through the multiple cores 1100 based on the modified core pairing information. That is, in processing the second instruction, the apparatus for parallel processing 1000 may have another zero core perform the calculations for the operands that need to be processed by the core determined to have a fault.

Figure 3:
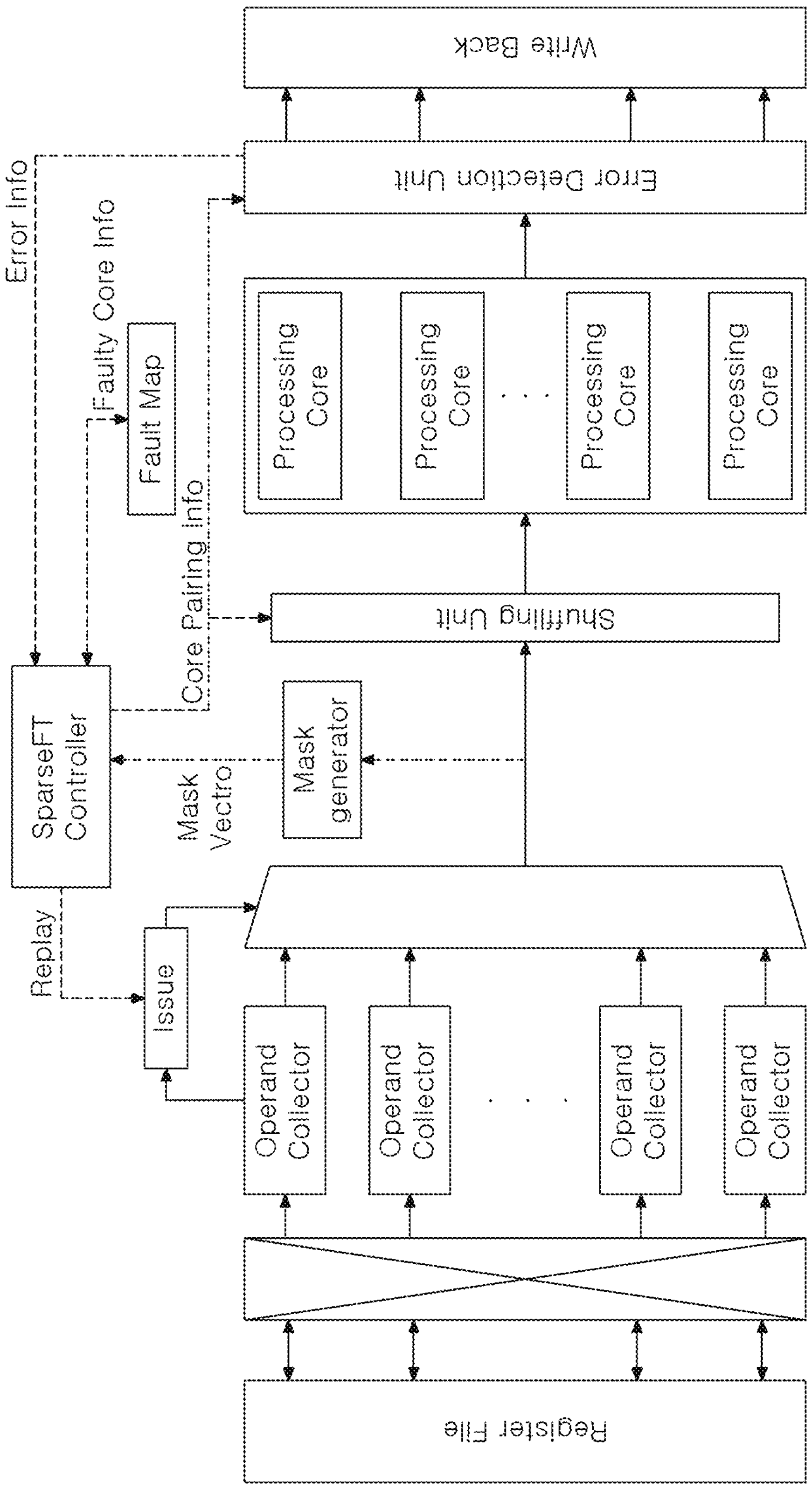
FIG. 3 is a view illustrating the overall flow of SM calculations of a GPU to which the apparatus for parallel processing according to an embodiment of the present invention is applied.

FIG. 3 is a view illustrating the overall flow of SM calculations of a GPU to which the apparatus for parallel processing according to an embodiment of the present invention is applied.

With reference to FIG. 3, multiple instructions included in a register file are stored in an operand collector along with instruction information and operands, and the instruction information and operands stored in each operand collector (buffer) are transferred to a processing core by the command of an issue. A mask generator may search for zero threads among multiple threads using the instruction and operands stored in the operand collector. A shuffling unit also may deliver the operand allocated to one non-zero core to at least one zero core based on the core pairing information. An error detection unit may compare the calculation results of the non-zero core and zero core that calculated the same non-zero thread among the calculation results for each thread of the multiple cores 1100, to determine whether an error has occurred in the calculations of the non-zero core. When the error detection unit determines that there is no error in the calculations performed by the non-zero core or zero core, because the calculation results of the non-zero core and zero core match, the calculation result of the non-zero core may be used as the result of calculating the non-zero thread, while the zero core may use zero as the calculation result, which is delivered to a write back. This is because the calculation result of the zero thread, which should have been calculated by the zero core during parallel processing, would have been zero. When the error detection unit determines that an error has occurred in the calculations of the non-zero core, the error detection unit may deliver information on the non-zero core where the error occurred (Error info.) to a sparseFT controller. The sparseFT controller may request the issue to resend the previously sent instruction, as the sparseFT controller needs to re-perform the processing of the previously processed instruction in order to correct the error that occurred in the calculations of the non-zero core. When the instruction is resent, the shuffling unit may deliver the same thread as the non-zero thread that is to be processed by the non-zero core where the calculation error occurred to two or more zero cores. The error detection unit may determine whether there is a fault in the non-zero core based on the recalculation results of the non-zero core and two or more zero cores. When the calculation results of the non-zero core and two or more zero cores match, the error detection unit may use the calculation result of the non-zero core that performed recalculations and deliver the calculation result to the write back as the calculation result of the non-zero core. This is because the error that occurred during the first calculation of the non-zero core did not occur during the recalculation. When the calculation results of two or more zero cores match each other but do not match the calculation result of the non-zero core, the error detection unit may determine that the non-zero core has a fault, i.e., a permanent defect has occurred. The error detection unit may deliver fault information on the non-zero core (faulty core info.) to the sparseFT controller. In this case, the error detection unit may use the calculation result of the two or more zero cores that match each other as the calculation result of the non-zero core and deliver the calculation result to the write back. The sparseFT controller may store the fault information on the non-zero core (faulty core info.) in a fault map. The sparseFT controller may modify the core pairing information (core pairing info.) to have another core (non-zero core) perform the calculations to be performed by the core in which a fault has occurred, based on the fault information (faulty core info.) stored in the fault map.

Figure 4:
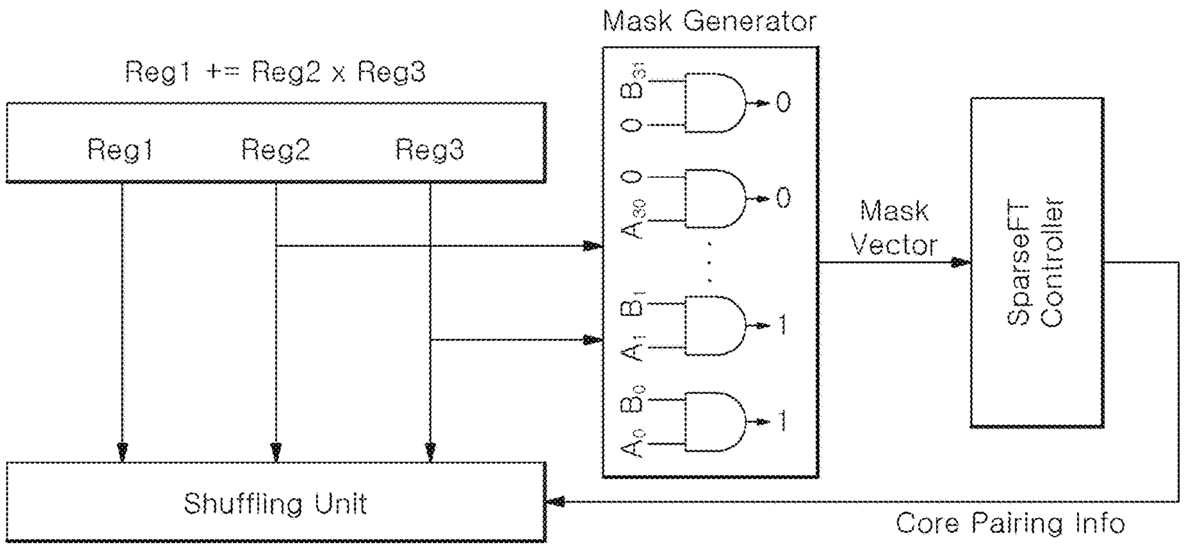
FIG. 4 is a view illustrating an example of the apparatus for parallel processing searching for a zero core according to an embodiment of the present invention.

FIG. 4 is a view illustrating an example of the apparatus for parallel processing searching for a zero core according to an embodiment of the present invention.

With reference to FIG. 4, the mask generator may perform logical multiplication calculations (logical AND calculations) using an AND gate for the operands of the multiplication calculations (Reg 2, Reg 3) among the operands of each thread (Reg 1, Reg 2, Reg 3). The result of these logical multiplication calculations (mask vector) may be delivered to the sparseFT controller. In this case, when the result of the logical multiplication calculations is zero, this corresponds to a zero thread where at least one of the operands in the multiplication calculations is zero.

FIG. 5A to FIG. 5D are views illustrating an example of the apparatus for parallel processing allocating threads to each core according to an embodiment of the present invention.

Figure 5A:
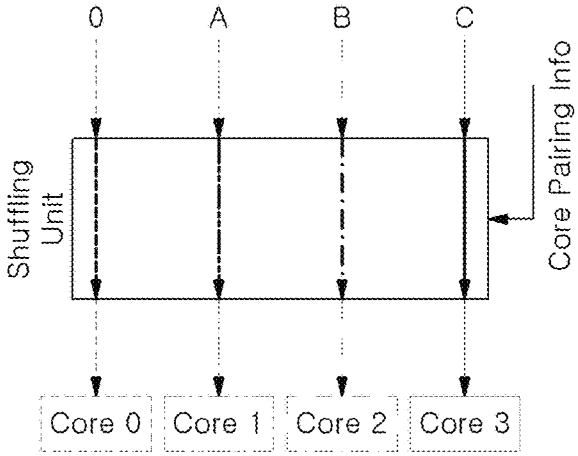
FIG. 5A to FIG. 5D are views illustrating an example of the apparatus for parallel processing allocating threads to each core according to an embodiment of the present invention.

With reference to FIG. 5A, when the number of zero threads (or zero cores) is less than or equal to a predetermined threshold, that is, when the number of zero threads is less than or equal to the number of non-zero threads, the apparatus for parallel processing 1000 may perform calculations for the threads in each of the multiple cores 1100 without re-allocating threads for error detection, according to the threads that have already been allocated. That is, when the number of zero threads is less than the number of non-zero threads, the apparatus for parallel processing 1000 may not perform an error detection operation.

Figure 5B:
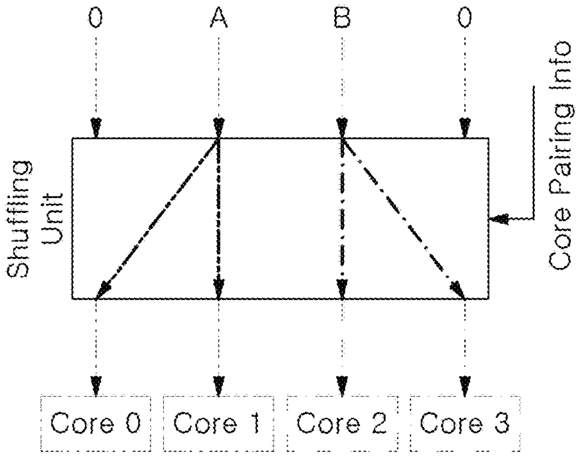

With reference to FIG. 5B, when core 0 and core 3, which have been allocated the zero thread (0), correspond to zero cores, and core 1 and core 2, which have been allocated the non-zero threads (A, B), correspond to non-zero cores, the apparatus for parallel processing 1000 may reallocate the non-zero threads (A, B) to core 0 and core 3, allowing core 0 to perform the same calculations as core 1, and core 3 to perform the same calculations as core 2. Subsequently, the apparatus for parallel processing 1000 may compare the calculation results of core 0 and core 1 to determine whether an error has occurred in the calculations of core 1, and compare the calculation results of core 2 and core 3 to determine whether an error has occurred in the calculations of core 2.

Figure 5C:
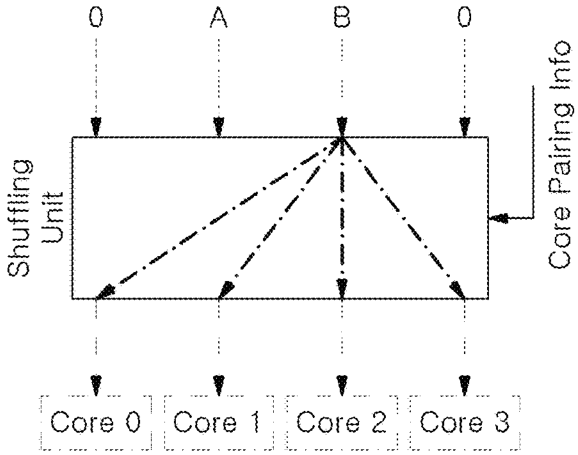

With reference to FIG. 5C, when an error occurs in the calculations of core 2 as a result of the calculations in FIG. 5B, the apparatus for parallel processing 1000 may reallocate the thread (B) allocated to core 2 to all of core 0 to core 3, and have core 0 to core 3 perform the calculations for thread (B). The apparatus for parallel processing 1000 may compare the calculation results of core 0 to core 3 to correct the error of core 2. When the calculation results of core 0, core 1, and core 3 match each other, but do not match the calculation result of core 2, it means that a fault has occurred in core 2. Therefore, the apparatus for parallel processing 1000 may correct the error of core 2 by replacing the calculation result of core 2 with the calculation result of core 0, core 1, and core 3.

Figure 5D:
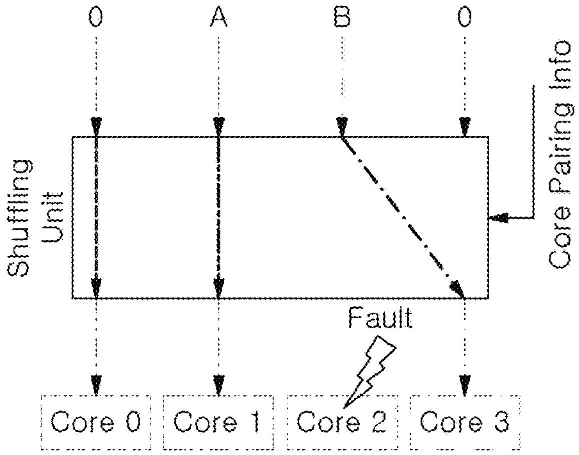

With reference to FIG. 5D, when it is determined that a fault has occurred in core 2, the apparatus for parallel processing 1000 may also allocate the non-zero thread that was to be allocated to core 2 to core 3, which is to be allocated a zero thread, when processing subsequent instructions, allowing core 3 to perform the calculations for the non-zero thread that core 2 was supposed to calculate. Subsequently, the apparatus for parallel processing 1000 may use the calculation result from core 3 as the calculation result of core 2.

Figure 6:
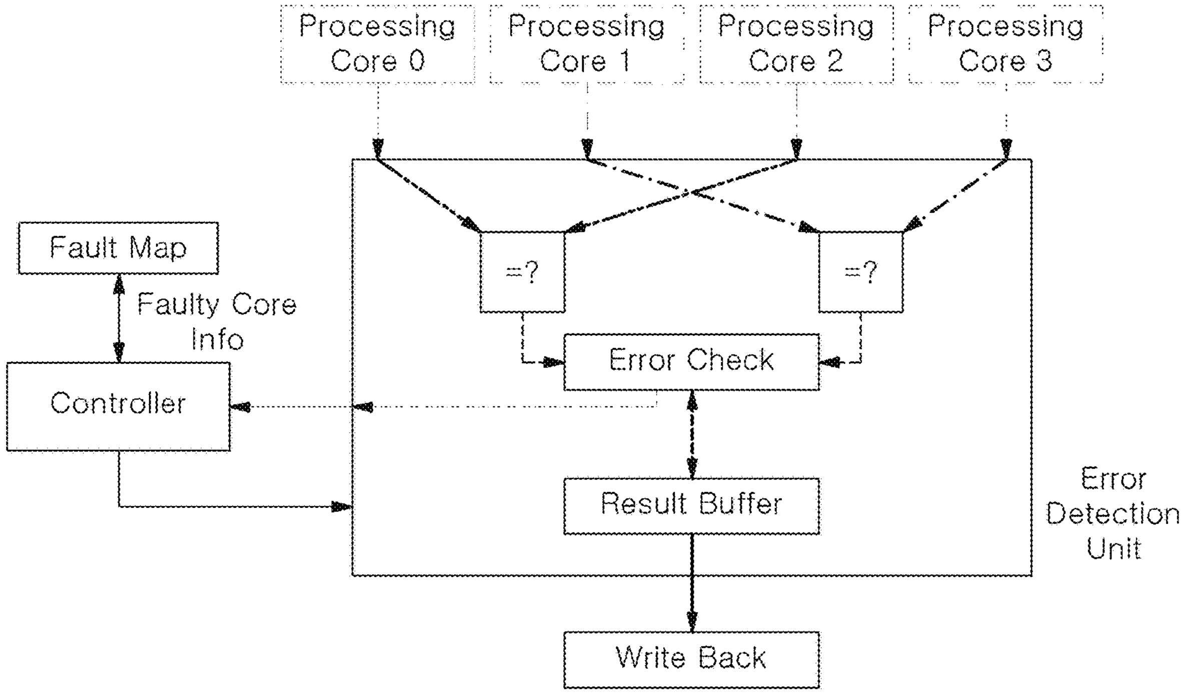
FIG. 6 is a view illustrating an error detection process of the apparatus for parallel processing according to an embodiment of the present invention.

FIG. 6 is a view illustrating an error detection process of the apparatus for parallel processing according to an embodiment of the present invention.

With reference to FIG. 6, the apparatus for parallel processing 1000 may allocate a first non-zero core (Processing Core 0) and a first zero core (Processing Core 2) to perform calculations for a first non-zero thread, and allocate a second non-zero core (Processing Core 1) and a second zero core (Processing Core 3) to perform calculations for a second non-zero thread. The error detection unit may use the core pairing information to compare whether the calculation results of the first non-zero core (Processing Core 0) and the first zero core (Processing Core 2), which performed calculations for the first non-zero thread, match each other, and whether the calculation results of the second non-zero core (Processing Core 1) and the second zero core (Processing Core 3), which performed calculations for the second non-zero thread, match each other. In this case, the error detection unit may use a MUX (not illustrated) to deliver the calculation results of each core to a comparator (not illustrated), and compare the calculation results of the cores using the comparator. The error detection unit may determine that an error has occurred in the calculation result of the calculation core when the calculation results do not match using the results of comparing the calculation results of cores in the comparator. The error detection unit may deliver information on the core where the error occurred to the controller (SparseFT controller).

Figure 7:
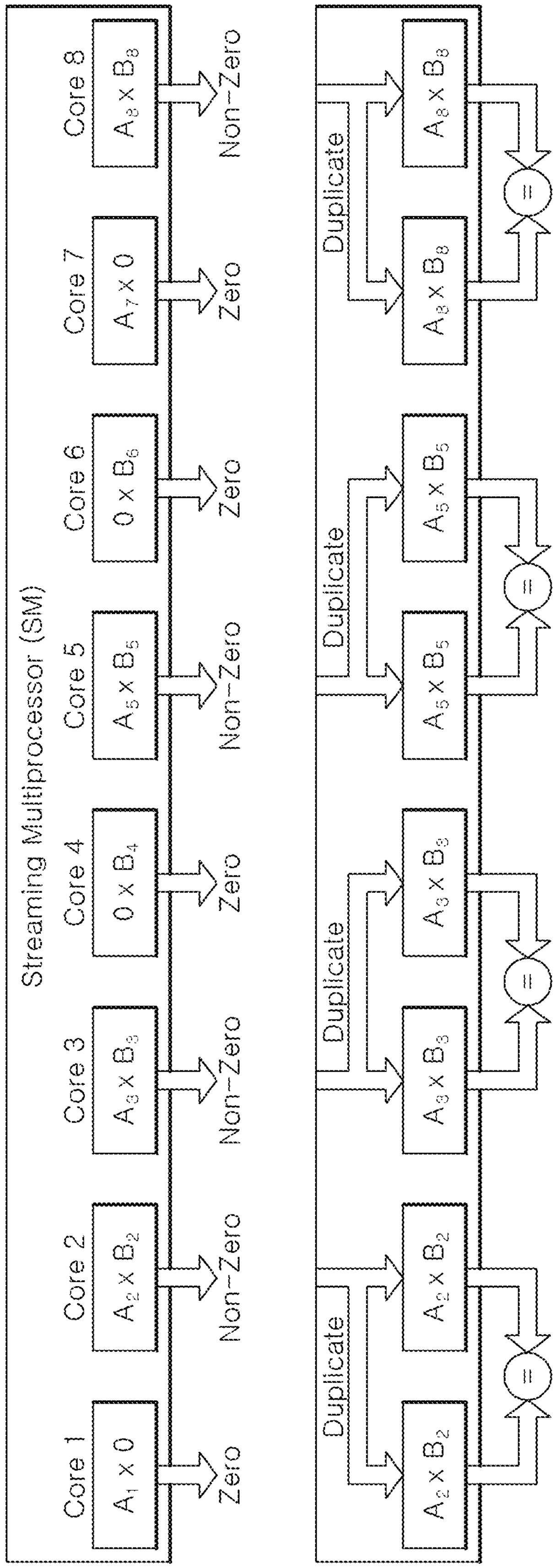
FIG. 7 is a view illustrating an example of allocating threads for error detection according to an embodiment of the present invention.

FIG. 7 is a view illustrating an example of allocating threads for error detection according to an embodiment of the present invention.

With reference to FIG. 7, an example is illustrated in which the multiple cores 1100 of the apparatus for parallel processing 1000 perform calculations. The apparatus for parallel processing 1000 may distribute and allocate multiple threads to each of the multiple cores 1100. Among the threads allocated to each of core 1 to core 8 by the apparatus for parallel processing 1000, the threads allocated to core 1, core 4, core 6, and core 7 correspond to zero threads where at least one operand is zero. When a zero core that processes a zero thread is searched, the apparatus for parallel processing 1000 may copy the same thread as the thread (operand) allocated to the non-zero core and allocate the same thread to the zero core, so that the zero core redundantly performs the same calculations as the non-zero core.

Figure 8A:
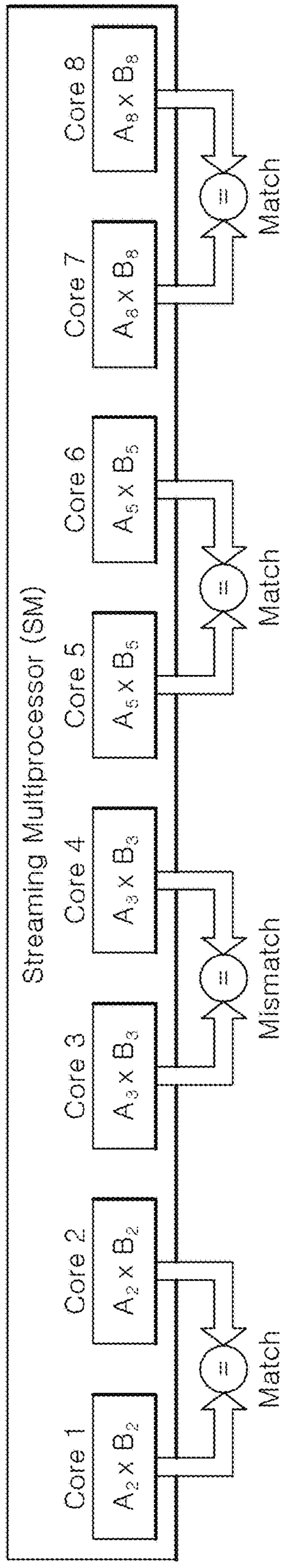
FIG. 8A to FIG. 8C are views illustrating error detection and correction according to an embodiment of the present invention.
Figure 8B:
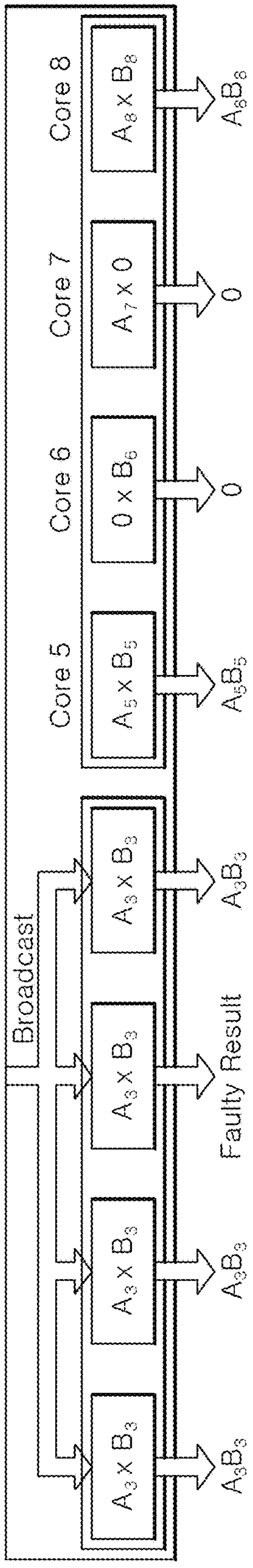
Figure 8C:
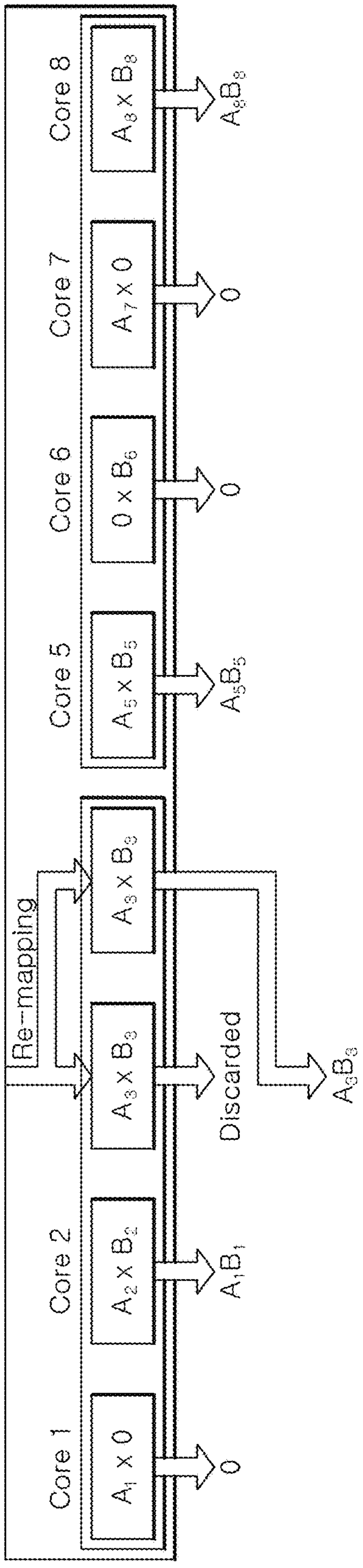

FIG. 8A to FIG. 8C are views illustrating error detection and correction according to an embodiment of the present invention.

With reference to FIG. 8A, after performing the calculations as illustrated in FIG. 7, the apparatus for parallel processing 1000 may compare the calculation results of the non-zero core and zero core that performed calculations for the same thread to determine whether the calculation results match. The apparatus for parallel processing 1000 may determine that an error has occurred in the calculations of core 3, which is a non-zero core, because the calculation results of core 3 and core 4 do not match.

With reference to FIG. 8B, the apparatus for parallel processing 1000 may allocate the same thread to other cores, i.e., core 1 to core 4, to each perform calculations in each of core 1 to core 4 in order to correct the calculation error of core 3. The apparatus for parallel processing 1000 may determine that a fault has occurred in core 3 when the calculation result of core 3 does not match the results of cores 1, 2, and 4.

With reference to FIG. 8C, the apparatus for parallel processing 1000 may modify the core pairing information based on fault information on core 3, so that the thread that core 3 was supposed to process is allocated to another zero core when processing subsequent instructions.

Figure 9:
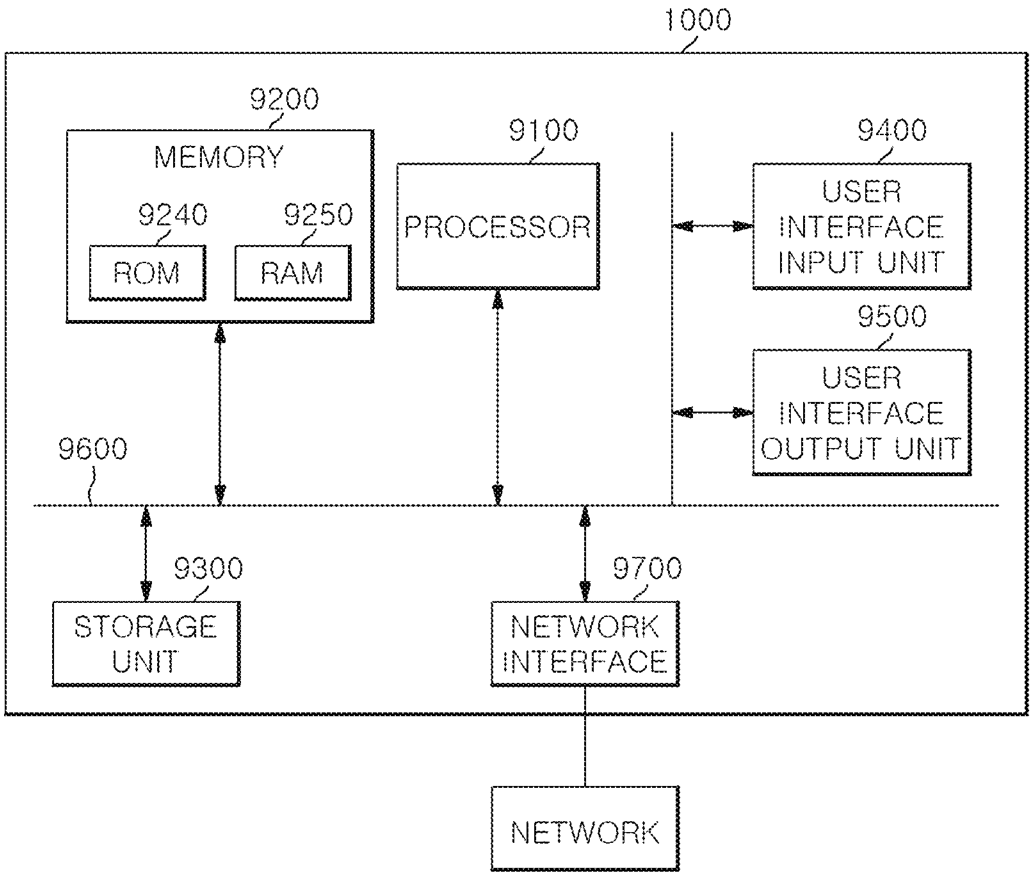
FIG. 9 is a block diagram of an apparatus for parallel processing according to another embodiment of the present invention.

FIG. 9 is a block diagram of an apparatus for parallel processing according to another embodiment of the present invention.

As illustrated in FIG. 9, the apparatus for parallel processing 1000 may include at least one of elements of a processor 9100, a memory 9200, a storage unit 9300, a user interface input unit 9400, or a user interface output unit 9500, which may communicate with each other through a bus 9600. In addition, the apparatus for parallel processing 1000 may also include a network interface 9700 to connect to a network. The processor 9100 may be a CPU or semiconductor device that executes processing instructions stored in the memory 9200 and/or the storage unit 9300. The memory 9200 and the storage unit 9300 may include various types of volatile and non-volatile memory media. For example, the memory may include a ROM 9240 and a RAM 9250.

The device described above may be implemented using hardware components, software components, and/or a combination of hardware and software components. For example, the device and components described in the embodiments may be implemented using one or more general-purpose or special-purpose computers, such as a processor, controller, arithmetic logic unit (ALU), digital signal processor (DSP), microcomputer, field-programmable array (FPA), programmable logic unit (PLU), microprocessor, or any other device capable of executing and responding to instructions. The processing device may execute one or more software applications operating on an operating system (OS).

Additionally, the processing device may access, store, manipulate, process, and generate data in response to the execution of software. For convenience, a single processing device may be described, but it will be understood by those skilled in the art that the processing device may include multiple processing elements and/or multiple types of processing elements. For example, the processing device may include multiple processors or a combination of a processor and a controller. Other processing configurations, such as a parallel processor, may be also possible.

Software may include computer program, codes, instructions, or any combination thereof, which can configure the processing device to operate as desired or collectively command the processing device independently or in combination. Software and/or data may be permanently or temporarily embodied in any type of machine, component, physical device, virtual equipment, computer storage medium or device, or transmitted signal wave to be interpreted by or provide instructions or data to the processing device. Software may also be distributed across networked computer systems and stored or executed in a distributed manner. Software and data may be stored on one or more computer-readable recording media.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method of operating an apparatus for parallel processing including multiple cores, comprising:

searching for a zero core among the multiple cores performing multiplication calculations to process a first instruction, wherein the zero core includes at least one operand of the multiplication calculations performed by each of the multiple core that is zero;

performing multiplication calculations in each of the multiple cores, wherein at least one zero core performs the multiplication calculations for same operands as operands of a non-zero core, wherein the non-zero core includes operand that is not zero; and comparing a calculation result of the at least one zero core with a calculation result of the non-zero core to determine whether calculation error has occurred, and in response to determining that a calculation error has occurred, stopping input of an instruction to be processed after the first instruction, wherein the comparing the calculation result includes:

when calculation results of two or more zero cores match each other but do not match the calculation result of the non-zero core, determining that there is a fault in the non-zero core; and setting the calculation results of the two or more zero cores as the calculation result of the non-zero core.

2. The method of claim 1, wherein in determining whether the calculation error has occurred, when the calculation result of the at least one zero core does not match the calculation result of the non-zero core, it is determined that an error has occurred in the multiplication calculations performed by the non-zero core or the at least one zero core.

3. The method of claim 1, further comprising:

re-performing, by at least three cores including the non-zero core and the zero core among the multiple cores, multiplication calculations for operands calculated by the non-zero core when it is determined that an error has occurred in the multiplication calculations performed by the non-zero core or the zero core; and determining whether there is a fault in the non-zero core based on multiplication calculation results of the at least three cores.

4. The method of claim 3, wherein in the determining whether there is a fault in the non-zero core or the zero core, when the multiplication calculation result of the non-zero core or the zero core among the at least three cores does not match calculation results of the other cores, it is determined that there is a fault in the non-zero core or the zero core.

5. The method of claim 4, further comprising:

setting, when it is determined that there is a fault in the non-zero core or the zero core, in processing a second instruction, to be processed after the first instruction has been processed, another zero core to perform multiplication calculations to be performed in the non-zero core or zero core determined to have a fault.

6. The method of claim 3, wherein in the re-performing of the multiplication calculations, when it is determined that there is an error in the multiplication calculations performed by the non-zero core or the zero core, processing of a second instruction, to be processed after the first instruction has been processed, is not started and the multiplication calculations are re-performed.

7. The method of claim 1, further comprising:

setting, when it is determined that an error has occurred in the multiplication calculations performed by the non-zero core or the zero core, and calculation results of two or more cores match each other, the multiplication calculation results of the two or more cores as the multiplication calculation result of the non-zero core or the zero core.

8. The method of claim 1, wherein the first instruction includes multiplication calculations for a sparse matrix.

9. The method of claim 1, wherein in the searching for the zero core, the zero core is searched by performing logical multiplication calculations on operands to be processed by each of the multiple cores in the first instruction to identify whether at least one operand is zero.

10. An apparatus for parallel processing, comprising:

multiple cores that perform parallel processing;

a memory configured to store at least one instruction; and a processor configured to execute the at least one instruction stored in the memory, wherein the at least one instruction, when executed by the processor, causes the processor to:

search for a zero core among the multiple cores performing multiplication calculations to process a first instruction, wherein the zero core includes at least one operand of the multiplication calculations performed by each of the multiple core that is zero;

perform multiplication calculations in each of the multiple cores and control at least one zero core to perform the multiplication calculations for same operands as operands of a non-zero core, wherein the non-zero core includes operand that is not zero; and determine whether calculation error has occurred by comparing a calculation result of the at least one zero core with a calculation result of the non-zero core, wherein in response to determining that a calculation error has occurred, ther processor stops input of an instruction to be processed after the first instruction, and wherein when calculation results of two or more zero cores match each other but do not match the calculation result of the non-zero core, the processor is configured to determine that there is a fault in the non-zero core; and set the calculation results of the two or more zero cores as the calculation result of the non-zero core.

11. The apparatus of claim 10, wherein the processor is further configured to determine that there is an error in the multiplication calculations performed by the non-zero core or the zero core when the multiplication calculation result of the at least one zero core does not match the multiplication calculation result of the at least one non-zero core.

12. The apparatus of claim 10, wherein the processor is further configured to control at least three cores, including the non-zero core and the zero core among the multiple cores, to re-perform multiplication calculations for operands calculated by the non-zero core when it is determined that there is an error in the multiplication calculations performed by the non-zero core or the zero core, and wherein the processor is further configured to determine whether there is a fault in the non-zero core or the zero core based on multiplication calculation results of the at least three cores.

13. The apparatus of claim 12, wherein the processor is further configured to determine that there is a fault in the non-zero core or the zero core when the multiplication calculation result of the non-zero core or the zero core among the at least three cores does not match calculation results of the other cores.

14. The apparatus of claim 13, wherein the processor is further configured to set, when it is determined that there is a fault in the non-zero core or the zero core, in processing a second instruction, to be processed after the first instruction has been processed, another zero core to perform multiplication calculations to be performed in the non-zero core or zero core determined to have a fault.

15. The apparatus of claim 12, wherein the processor is further configured to control to re-perform the multiplication calculations without starting processing of a second instruction, to be processed after the first instruction has been processed, when it is determined that there is an error in the multiplication calculations performed by the non-zero core or the zero core.

16. The apparatus of claim 10, wherein the processor, when it is determined that there is an error in the multiplication calculations performed by the non-zero core or the zero core, and calculation results of two or more zero cores match each other, is further configured to set the multiplication calculation results of the two or more zero cores as the multiplication calculation result of the non-zero core.

17. The apparatus of claim 10, wherein the first instruction includes multiplication calculations for a sparse matrix.

18. The apparatus of claim 10, wherein the processor is further configured to search for the zero core by performing logical multiplication calculations for operands to be processed by each of the multiple cores in the first instruction to identify whether at least one operand is zero.

19. A method of operating an apparatus for parallel processing including multiple cores, comprising:

receiving an instruction that includes N threads as input;

allocating the N threads to each of multiple cores;

searching for at least one zero thread among the N threads, where at least one of operands of multiplication calculations is zero;

reallocating at least one zero core that has been allocated at least one zero thread to process the same non-zero thread as a non-zero core matched to a non-zero thread that is not the zero thread; and determining whether an error has occurred in the multiplication calculations of the non-zero core based on a multiplication calculation result of at least one zero core according to the reallocation and a multiplication calculation result of the non-zero core, and in response to determining that a calculation error has occurred, stopping input of an instruction to be processed after the first instruction, wherein the determining whether an error has occurred includes:

when calculation results of two or more zero cores match each other but do not match the calculation result of the non-zero core, determining that there is a fault in the non-zero core; and setting the calculation results of the two or more zero cores as the calculation result of the non-zero core.

* * * * *